C. M. & W. F. LUNT.
Fruit-Gatherer.
No. 57,741. Patented Sept 4, 1866.
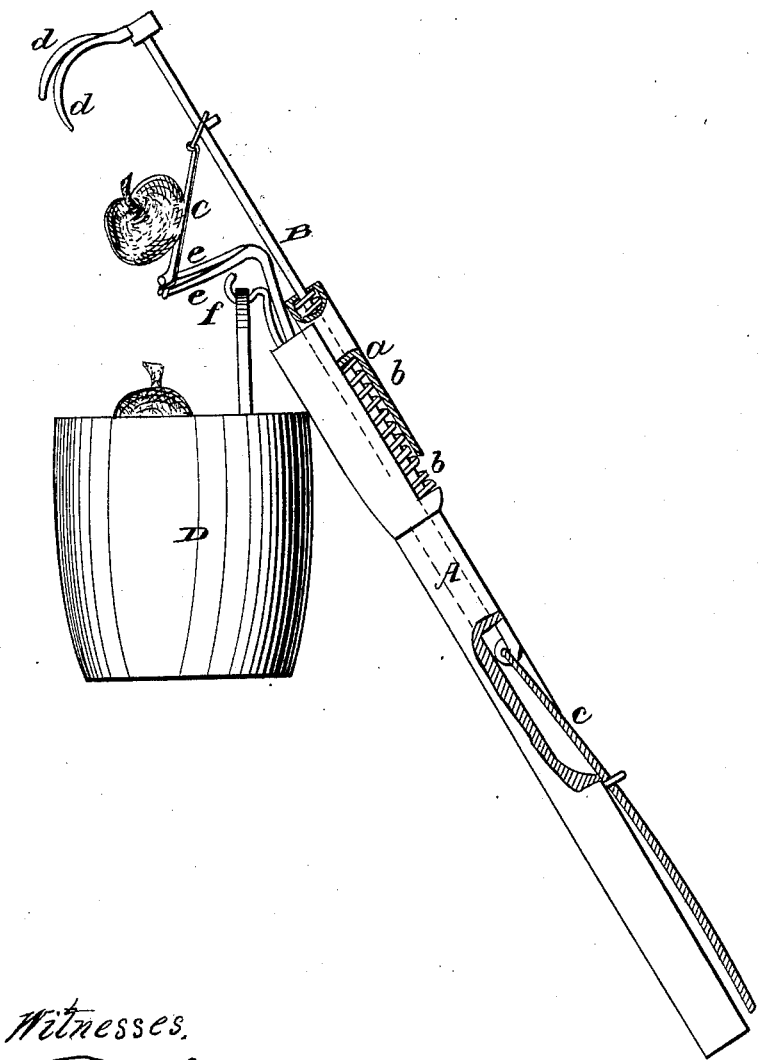

UNITED STATES PATENT OFFICE

C. M. LUNT AND W. F. LUNT, OF BIDDEFORD, MAINE.

IMPROVEMENT IN FRUIT-PICKERS.

Specification forming part of Letters Patent No. 57,741, dated September 4, 1866.

*To all whom it may concern:*

Be it known that we, CYRUS M. LUNT, and WILBUR F. LUNT, of Biddeford, in the county of York and State of Maine, have invented a new and Improved Fruit-Picker; and we do hereby declare that the following is a full, clear, and exact description thereof, which will enable others skilled in the art to make and use the same, reference being had to the accompanying drawing, forming part of this specification.

The drawing is a side elevation of our invention.

Our invention consists in the combination of a sliding rod, having tines upon its end, with an apron for conducting the fruit into the basket, as will be presently described.

A designates the handle or pole of the implement. This may be long or short, according as to the nature of the tree which bears the fruit to be gathered.

Near one end of this handle there is arranged a box, *a*, which is fitted into a groove in the said handle. Through this box there extends a rod, B, encircled by a spiral spring, *b*, whose lower end bears against the lower end of the box *a*, and whose upper end is so secured to the rod B that when the rod B is drawn toward the person using the picker the spring will, immediately on its being released, resume a proper position for picking another article of fruit.

To the lower end of rod B there is fastened a string or cord, *c*, which is carried down the handle, so that it can be grasped in the hand of the person using the picker for operating the rod B.

The outer end of the rod B carries a number of tines, *d*. In picking fruit—an apple, for instance—the tines are placed so that two will straddle the stem of the apple, which, on drawing down the rod, will pull the apple from the bough, as can be readily understood.

C is a guide-apron secured at one end by suitable arms *e e* to the upper end of the pole A, and fastened at the other to the sliding rod B in such manner that when the rod is drawn down the upper end of the apron will be lowered, so as to the better catch the dropping fruit and break its fall. From the apron it rolls down into a basket, D, which is hung upon a hook, *f*, secured to the upper end of the pole A.

This is a simple and easily-operated fruit-picker, and the choicest fruit may be picked by it without danger of the fruit becoming bruised or injured.

What we claim as new, and desire to secure by Letters Patent, is—

An instrument for picking fruit, constructed and operating substantially as shown and described—that is to say, the combination of the handle A, rod B, tines *d*, spring *b*, cord *c*, apron C, and basket-supporting hook *f*, substantially as shown and described.

CYRUS M. LUNT.
WILBUR F. LUNT.

Witnesses:
GEO. G. HARTWELL,
GEORGE B. GOODWIN,
J. D. STETS.